United States Patent
Lenschow

[15] 3,701,227
[45] Oct. 31, 1972

[54] PRESSURE TANK FOR A NUCLEAR REACTOR

[72] Inventor: Rolf Johan Lenschow, Trondheim, Norway

[73] Assignee: Institutt for Atomenergi, Kjeller, Norway

[22] Filed: Feb. 27, 1970

[21] Appl. No.: 15,092

[30] Foreign Application Priority Data

Feb. 27, 1970 Norway ..................... 826/68

[52] U.S. Cl. ................................................. 52/224
[51] Int. Cl. ................................................. E04c 3/10
[58] Field of Search ................ 52/224, 248; 138/176

[56] References Cited

UNITED STATES PATENTS

| | | | |
|---|---|---|---|
| 2,048,253 | 7/1936 | Freysinnet | 52/224 X |
| 3,056,183 | 10/1962 | Pigeot | 138/176 X |
| 3,353,859 | 11/1967 | Schupack | 52/224 X |
| 3,389,516 | 6/1968 | Ziegler | 52/224 |

Primary Examiner—Richard J. Scanlan, Jr.
Attorney—Watson, Cole, Grindle and Watson

[57] ABSTRACT

The invention generally relates to a concrete pressure tank, particularly for a nuclear reactor, which is mounted in a rock shaft and prestressed by means of jacks disposed between the tank and shaft walls, in order to transfer prestressing forces to the tank from the surrounding rock.

A horizontal prestressing of the above type may be combined with a conventional vertical prestressing by means of vertical prestressing cables, or even the vertical prestressing may be accomplished in the above manner by means of jacks bearing against a filler load on the top of said tank in the shaft.

Said jacks are preferably of a membrane type adapted to be disposed in intervening slots between ribs, moulded either on the external tank wall or the internal shaft wall, and the opposing cylindric inner shaft or outer tank wall, respectively.

12 Claims, 3 Drawing Figures

PRESSURE TANK FOR A NUCLEAR REACTOR

The present invention relates to a pressure tank, particularly for a nuclear reactor and mounted in a pressure absorbing shaft.

With increasing sizes of power producing nuclear reactors, pressure tanks of concrete have been utilized to an increasing degree with gas-cooled reactors. This is due to the fact that larger units, higher pressures and stricter safety specifications seem to favor concrete pressure tanks rather than conventional steel tanks, which previously have been without competition in this field. As concrete is able to endure considerable compressive stresses, but only comparatively feeble tensile stresses, such tanks should be build from prestressed concrete. In several countries water reactor installations with pressure tanks of prestressed concrete have recently been planned. Investigations performed in Sweden lead to the conclusion that concrete tanks are economically favorable with water reactor powers above 600 MWe. The operation pressure of such a reactor is, however, very high, and this fact gives rise to special problems in relation to the the strength of the concrete construction, which requires an installation of a comprehensive network of prestressing cables in the walls of the concrete tank.

Thus, the space requirements of said cables will constitute an important construction problem with pressure tanks for water reactors. Also in addition to the prestressing cables, ordinary reinforcements, anchoring elements for the inner steel lining together with number of lead-ins and instruments must be accommodated in the concrete construction. The moulding of concrete in the resulting dense net of steel components, is very difficult and must be carried out with extraordinary skill and care to avoid local defects in the concrete walls. The general object of the present invention is to apply external pressure carrying elements cooperating with the concrete tank in such a manner that the use of prestressing cables may be totally or partly avoided.

To achieve this, it has previously been tried to dispose prestressing ring cables on the outside of the tank. Further, it has been suggested to arrange a system of steel rings around the tank, in order to obtain the desired prestressing of the same by means of jacks between said steel rings and the concrete walls. In practice, however, these solutions of the prestressing problem are difficult to realize in a satisfactory way and usually implies danger of corrosive attacks on the outer steel constructions.

It has also been suggested to reduce the wall thickness of a steel pressure tank by mounting the tank in an external, pressure absorbing container, which totally or partly absorbs the working pressure (see Norwegian Pat. No. 113,058). The external container may for instance be a shaft, blasted in rock (see Swedish Pat. Nos. 170,381 and 173,096), wherein the space between the pressure tank and the walls of the shaft is filled with a material which totally or partly receives the inner working pressure of the tank and transfers this pressure to said walls.

French Pat. No. 1,065,134 discloses a concrete tank disposed in a shaft and prestressed by means of compressive forces transferred from the shaft walls. In a mass of sand filled into the interspace between the walls of the tank and the shaft, there are disposed star-shaped tubes which may be put under pressure. As a consequence of the expansion of said tubes due to the inner pressure, compressive forces will appear in the sand, which in turn causes the desired prestressing of the tank.

This solution of the prestressing problem have several disadvantages. Firstly, the prestressing forces cannot be varied as desired, as said star-shaped tubes will not be able to assume their original shape upon a pressure reduction. Secondly, there will not be possible to pre-estimate the prestressing forces with a reasonable accuracy, as the compressive forces will be unevenly distributed in the sand, so that any precalculated values of magnitudes and directions of the prestressing forces will be uncertain. Further a concrete tank, prestressed according to the French Patent, will not be inspectable from the outside during operation, in order to locate possible cracks or the like; and a passage of pipelines or other components along the outer wall of the tank will be rather difficult to arrange with such a design.

According to the present invention, a concrete pressure tank, particularly for a nuclear reactor, is mounted in a pressure absorbing shaft, said tank being prestressed by means of compressive forces transferred from the walls of the shaft, whereby, as a general characteristic feature, jacks are disposed on the outside of the tank to produce said pressure forces by means of said walls and transferring the same to the tank.

The term "jack" designates here a device which is extendable to bridge the gap between two material masses and operative, by means of further forcible extension, to establish action and reaction forces between said masses, said forces being adjustable as desired.

In most cases it will be natural to dispose the tank in a rock shaft. However, the invention is also intended to comprise a pressure tank enclosed by an outer concrete tank, which, e.g., may be moulded down in a sand or clay ground. The massive counter-pressure effected by such ground usually is several times greater than the active earth pressure per se, which means that said outer concrete tank may be moulded with a relatively small wall thickness.

The jacks which are employed according to the invention, may be of the ordinary type with cylinder and piston, but preferably membrane jacks are utilized. Such jacks consist of two comparatively thin steel plates which are welded together along their edges, so as to form a closed interspace, which is connected to a pipeline system for supplying pressure fluid to said inner space.

A number of horizontal or vertical external ribs may be moulded on the outer tank wall. These ribs will shore up the tank wall, but their primary task is to transfer prestressing forces to the pressure tank itself, the jacks being disposed in slots between the ribs and the shaft walls.

Designating the inner radius and height of the tank with $r$ and $h$, respectively, the inner pressure $p$ will cause an asimutal force $= prh$ and a vertical force $= p\pi r^2$ in the side wall of the tank. These forces give rise to deformations, which, in turn, effect additional torques. If the pressure tank is exposed to external forces which are proportional to and greater than the internal forces, any section through the tank walls will experience a resultant compressive stress. To stand the internal pressure, concrete pressure tanks and especially pressure tanks for water reactors must be moulded with walls which are comperatively thick in relation to the tank diameter. This leads to a construction which is so rigid that an external force which is transferred through the ribs, will be nearly uniformly distributed over the tank wall.

The pertinent compressive forces may also be transferred from the walls of the rock shaft to the pressure tank through horizontal or vertical ribs moulded on the shaft walls. In this case the pressure tank will have a cylindric outer shape, and the jacks are to be inserted in the slots which are formed between the outer cylindric tank surface and said shaft ribs.

When the pressure tank is disposed in a rock shaft, the prestressing forces give rise to radial compressive stresses in the rock, whereas the possible resulting tensile stresses mainly will have axial and asimutal directions. Homogenious rock without cracks is able to absorb both tensile and compressive stresses. However, cracks are usually present, and in the direction perpendicular to a crack, the rock will not be able to absorb tensile stress. In such a case, however, the weight and inner friction of the rock will counteract the tensile stress caused by the prestressing of the concrete tank. Rock structures are loaded in a similar manner by pressure wells for water supplies, but in this case the walls of the well will be exposed to a truely uniformly distributed radial pressure. In the present case, however, the forces will be evened out to a practically constant radial stress over a radial distance presumably equal to the spacing of the ribs, so that the rock inwardly from this point will experience the same strain as in the above case.

A pressure tank must be mounted in a rather deep rock shaft to enable a loading filler on top of the tank to effect a satisfactory vertical prestressing of the same. Therefore, according to one embodiment of the invention the pressure tank is prestressed in the vertical direction by means of prestressing cables. The weight of the vertical prestressing cables representing only one-sixth to one-seventh of the total weight of a prestressing cable system applied alone, even the embodiment mentioned above will imply a substantial space saving in the concrete design.

After establishing the desired prestressing of the pressure tank, pressure absorbing spacers, e.g., steel wedges, may be inserted between the jacks to take over the effective transfer of compressive forces, when said jacks are released. The spacers may also consist of an injectable plastic material which solidifies after a certain time. The prestressing state may also be maintained by injecting said material in the membrane jacks. In the latter case membrane jacks with two or more separate interspaces in series should be applied, in order to allow further jacking operations at a later time.

To allow the total jack forces to be transferred to the tank walls without restrictions due to uneven upper and lower horizontal surfaces, the jacks in the slots along the top and bottom tank walls may be replaced by sliding layers of, e.g., graphite.

With certain types of nuclear reactors it is desireable to design the upper part of the tank as a removable lid. The lid may comprise two parts, namely a sealing lid and a pressure carrying lid on top of the same. A separate sealing lid implies an essential simplification of the sealing problem and reduces the total outward directed force in relation to such lids where the sealing is located at the top of the lid. In one embodiment the pressure carrying lid may be provided with a number of blocking members, which are maintained stationary by transferring compressive forces from the shaft walls to the lid through said blocking members. Said forces from the rock wall are usually transferred by means of a concrete lining for the blocking members. Jacks may be disposed either between the blocking members and said concrete lining or between the blocking members and the lid. If the tank is prestressed in vertical direction by means of cables, these cables will contribute the greater part of the vertical forces acting on the blocking members.

In another embodiment, the blocking members are put in place after the tightening of the prestressing cables. When the inner pressure is increased, the lid will rise from its support, so that the internal pressure on the lid will be transferred via the blocking members to the prestressing cables. A suitable outer ring will in this case provide the necessary sealing between the lid and the rest of the tank. This design allows a removal of the lid without a previous release of the tense cables.

By disposing a nuclear reactor in a rock shaft according to the invention, an economically very favorable, secondary safety confinement of said nuclear reactor may be obtained by placing a tightly sealing lid over the top opening of the shaft.

The invention also implies other economical advantages, as expensive prestressing cables are replaced by jacks which are very simple to produce. Also, it should be mentioned in this connection that relatively few cable types and dimensions are presently commercially available.

Even if the pressure tanks according to the invention particularly are intended to be utilized for nuclear reactors, they may also be applied with chemical reactors and as storage tanks for volatile or heavy materials. The force transferring principle, on which the invention is based, may also be applied for ground supports after blasting or excavation, when active, controlable supporting forces are desired.

The invention will now be further described by means of two embodiments, examplifying a pressure tank for a nuclear reactor according to the invention, with reference to the FIGS. 1 through 3 of the accompanying drawings.

Figure 1:
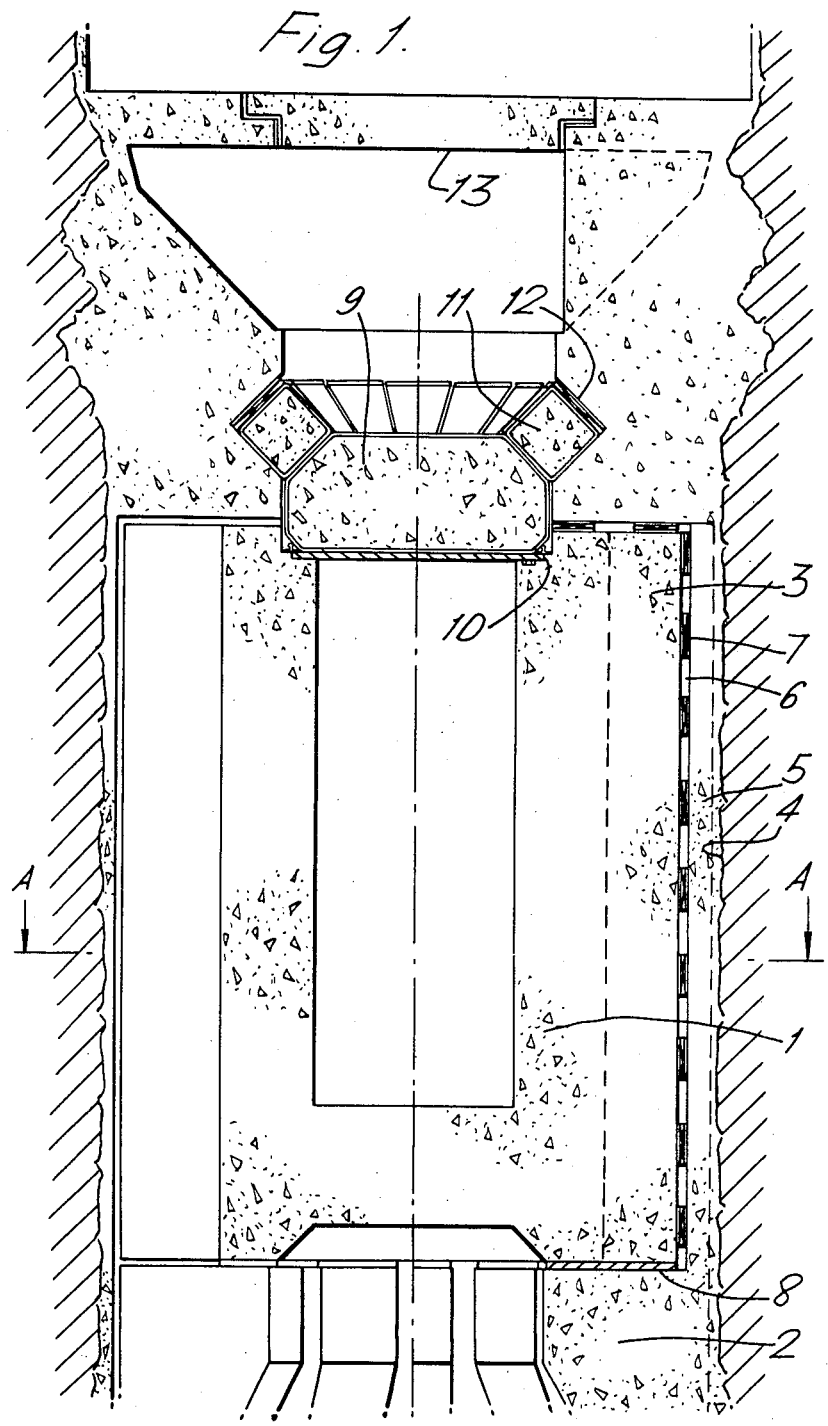
FIG. 1 shows an axial section through a concrete pressure tank which is disposed in a rock shaft and prestressed by means of jacks.

In FIG. 1, 1 designates a concrete pressure tank which rests on a moulded basement 2 in a rock shaft and is provided with vertical ribs 3. Between the shaft walls 4, which are furnished with a lining of concrete 5, and the ribs, prestressing jacks 7 are disposed in the intervening slots 6. In the same manner corresponding prestressing jacks are mounted between the horizontal top surface of the tank and the upper concrete lining. Between the horizontal bottom surface of the tank and the basement 2, a sliding layer 8 of graphite is arranged.

After adjusting the jacks to yield the desired prestressing force, these may be permanently locked in said state by replacing the pressure oil in the membrane jacks by a liquid material which solidifies after a certain time. The pipeline system for the operation of the jacks and for injection of the solidifying material is not shown in the Figures.

The pressure tank is designed with a lid system, consisting of an external pressure carrying lid 9 and a sealing lid 10. The lid is kept in place by means of a number of blocking members 11, which are pressed against the lid by blocking jacks 12.

Figure 2:
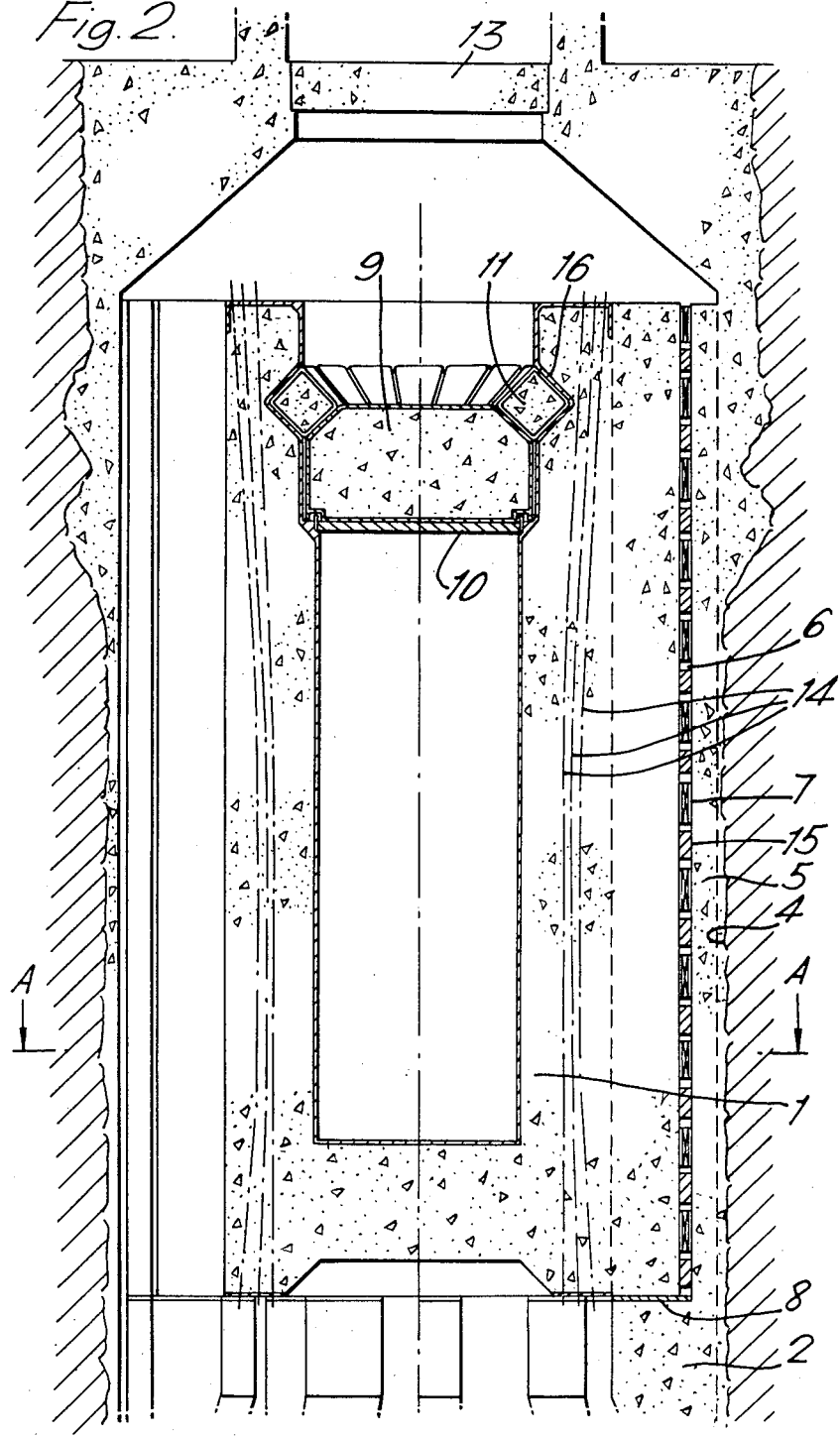
FIG. 2 shows an axial section through a corresponding pressure tank, vertically prestressed by means of cables.
Figure 3:
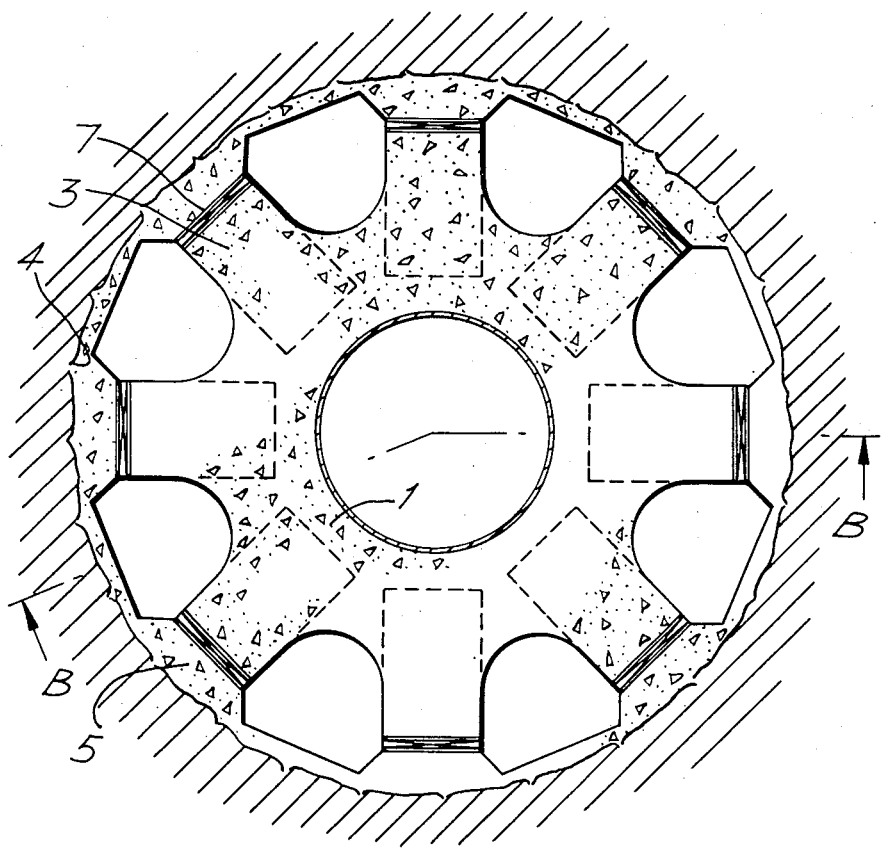
FIG. 3 shows a section A—A of the pressure tanks of FIGS. 1 and 2.

In FIG. 2, as in FIG. 1, the pressure tank is mounted in a rock shaft on a moulded basement 2 and provided with vertical ribs 3. Between the shaft walls 4, which are provided with a concrete lining 5, and the ribs, prestressing jacks 7 are disposed in the intervening slots 6 along the vertical surface of the tank. As in FIG. 1, the horizontal bottom wall of the tank rests on a sliding layer 8 of graphite.

The pressure tank is prestressed in the horizontal direction by means of prestressing jacks 7, whereas the prestressing in vertical direction is accomplished by means of prestressing cables 14. Between the jacks in the vertical slots 6, there are inserted suitable spacers 15. By means of these spacers, which in this case are constituted by steel wedges, the prestressing forces transferred from the shaft walls, may be maintained when the jacks are released. The top lid 9, 10, is kept in place by means of blocking members 11, which are transferring prestressing forces from the cables 14 via the steel lining 16. The blocking members and the steel lining are formed as trapezia or wedges with small inclination.

Both in FIG. 1 and 2 the top opening of the rock shaft is closed by means of a sealing lid 13.

I claim:

1. In combination, a pressure absorbing shaft having an inner wall, a concrete pressure tank having top, bottom and side outer walls mounted in said shaft, and means for prestressing said tank and comprising jacks disposed between the outside of said tank and the wall of said shaft for transferring pressure forces from said shaft wall to said tank.

2. The combination of claim 1, including prestressing cables prestressing said tank in the axial direction.

3. The combination of claim 1, said tank side wall being provided with a number of external ribs.

4. The combination of claim 1, said shaft wall being provided with a number of internal ribs.

5. The combination of claim 1, said jacks being disposed between said tank ribs and said shaft wall.

6. The combination of claim 1, said jacks being disposed between said shaft ribs and said tank outer side wall.

7. The combination of claim 1, said tank top and bottom walls being provided with sliding layers.

8. The combination of claim 1, including pressure absorbing spacers between adjacent jacks.

9. The combination of claim 1, said jacks being of the membrane type.

10. The combination of claim 9, each said jack comprising at least two independently operable interspaces.

11. The combination of claim 1, said tank having a double, removable lid.

12. The combination of claim 11, including a plurality of blocking members disposed between and engaging said shaft wall and lid.

* * * * *